Figure 1:
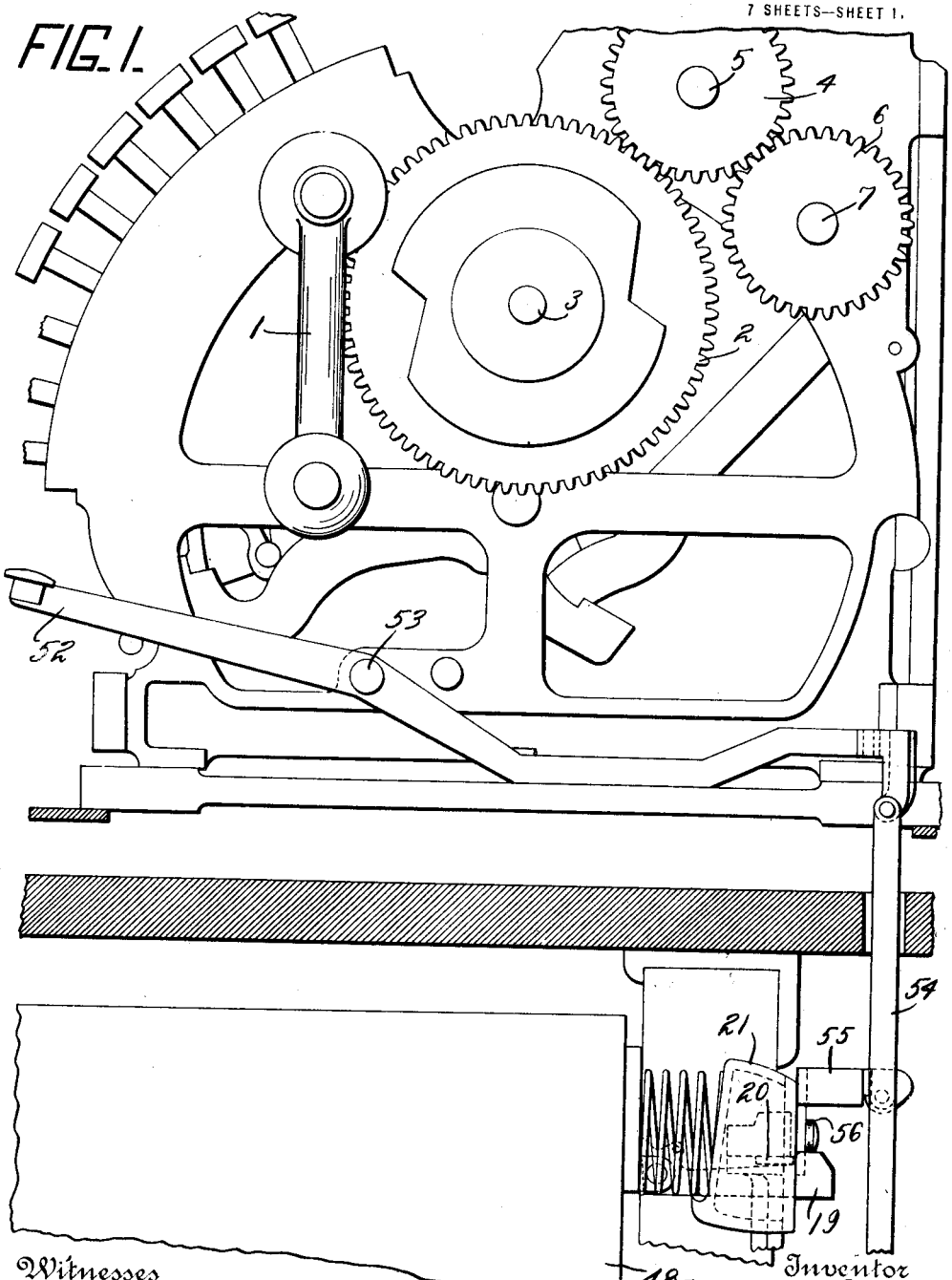

H. A. MARTIN.
DRAWER CONTROL FOR CASH REGISTERS.
APPLICATION FILED JULY 26, 1913.

1,183,021.

Patented May 16, 1916.
7 SHEETS—SHEET 3.

FIG.3.

Inventor
Haakon A. Martin

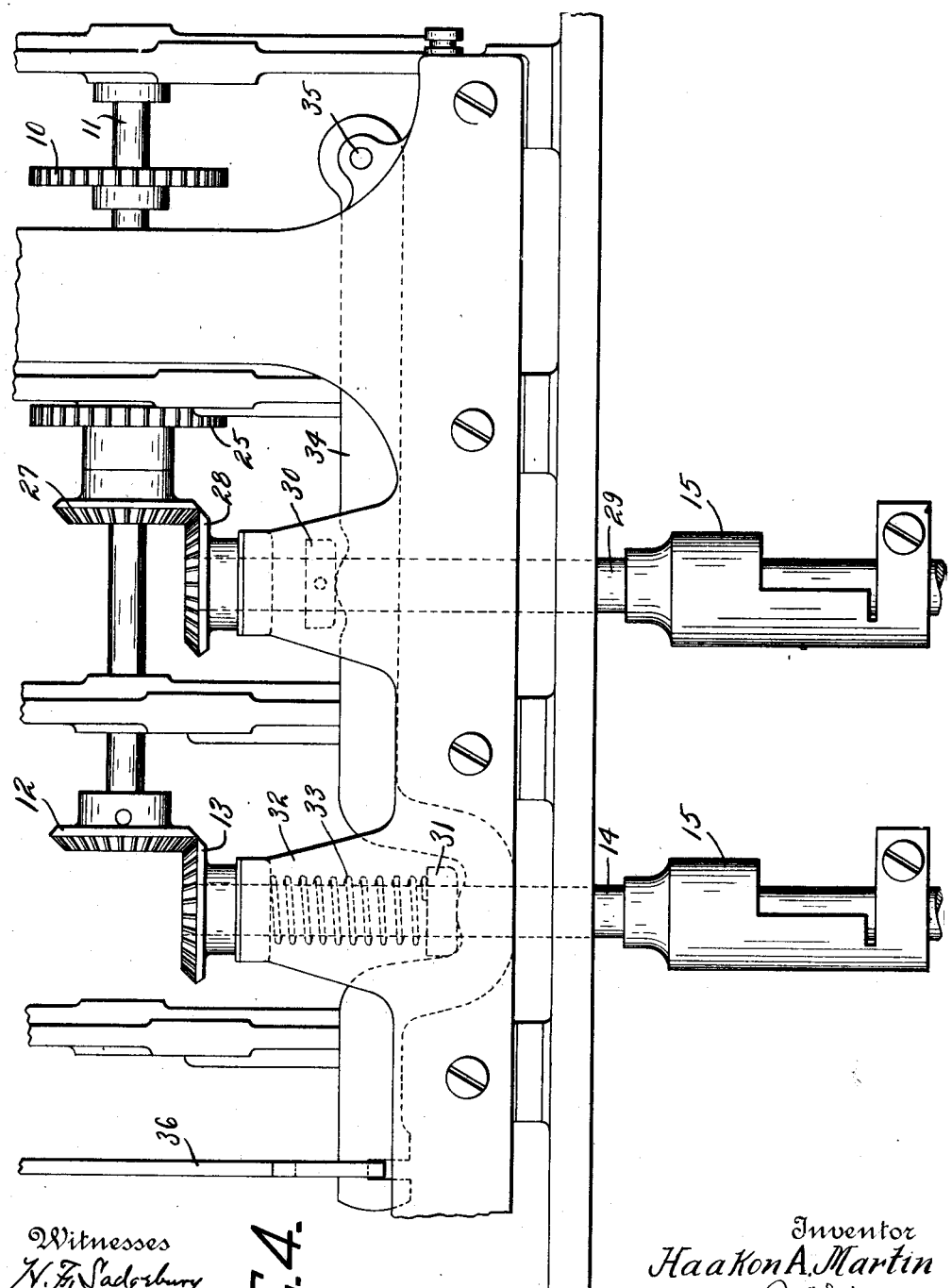

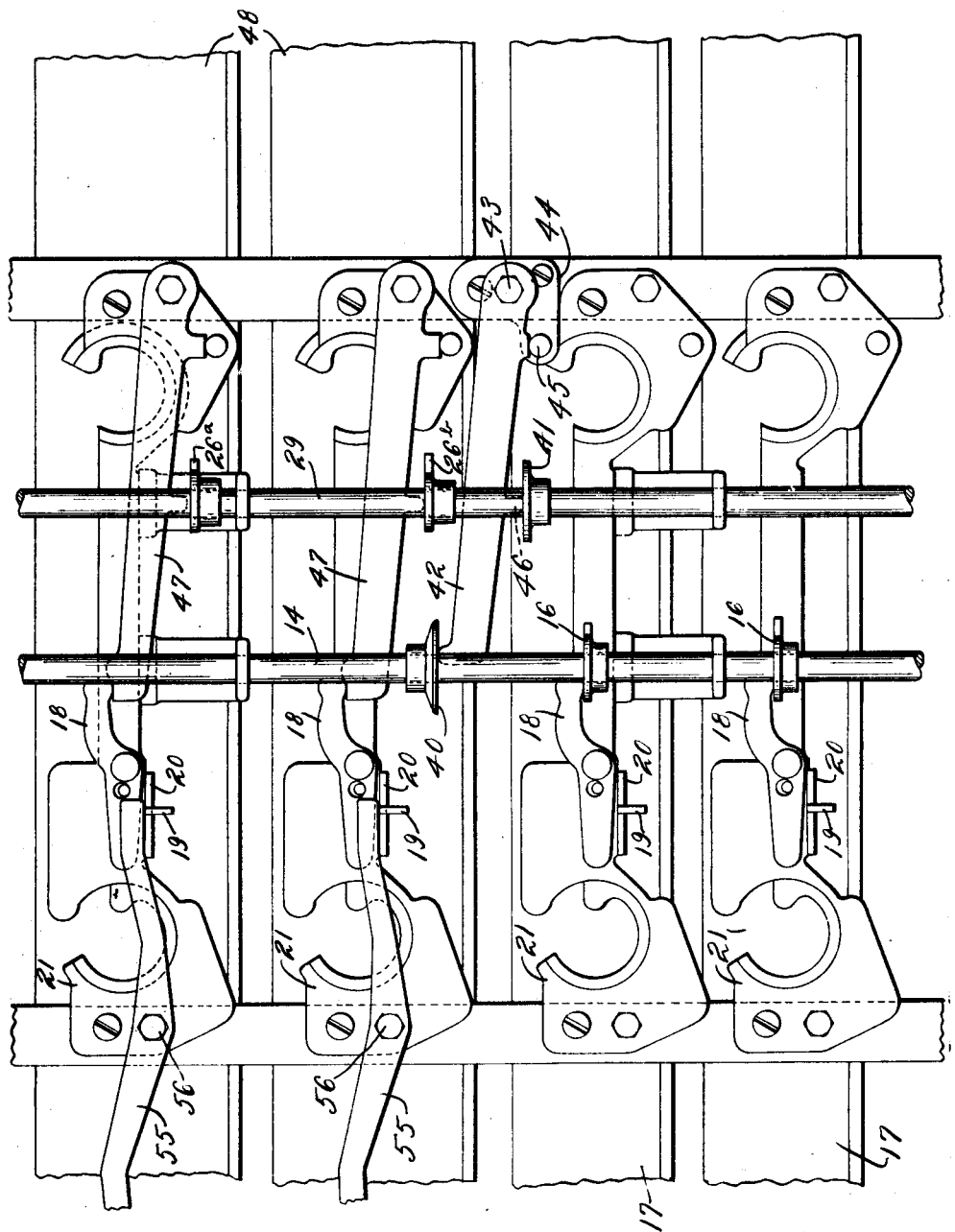

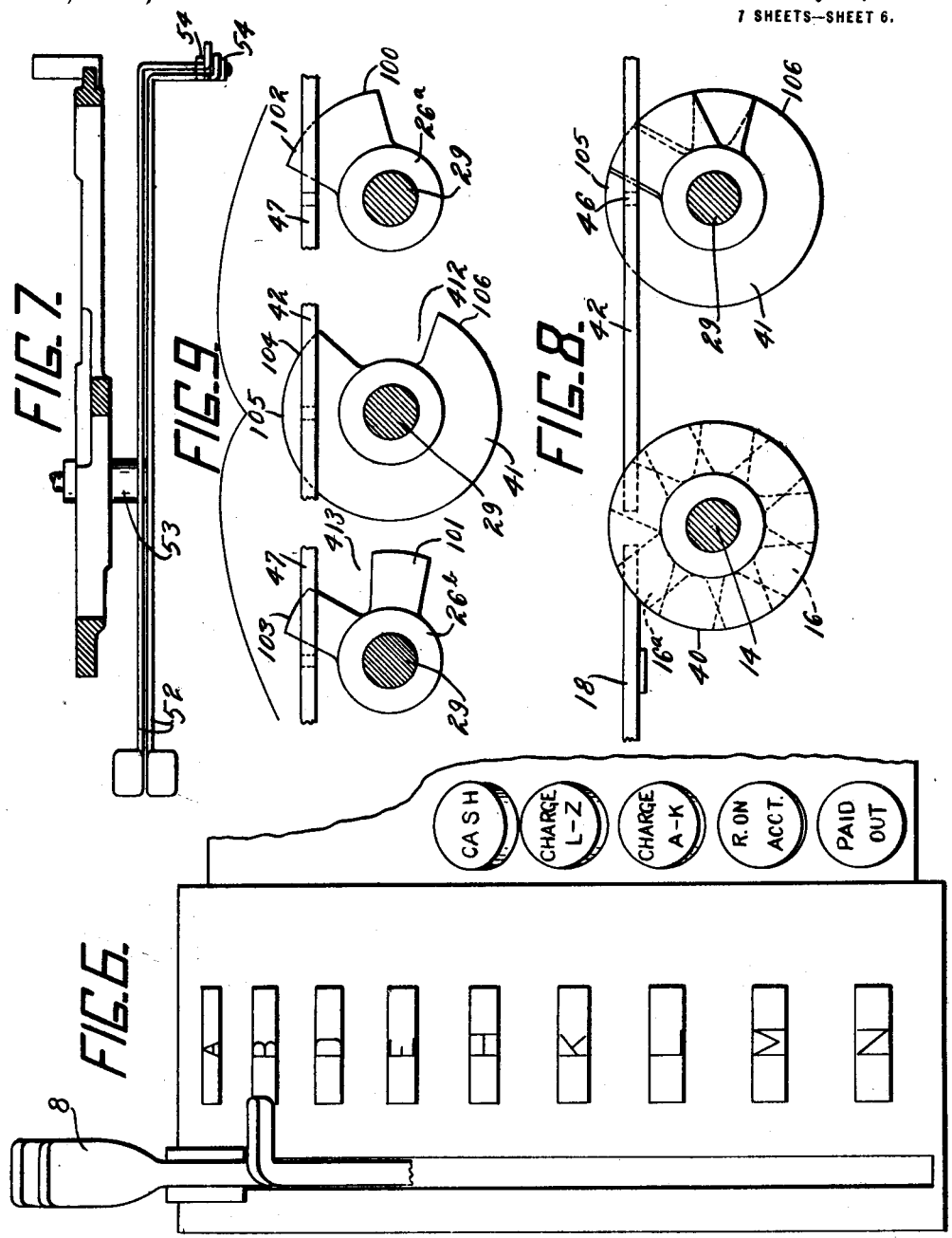

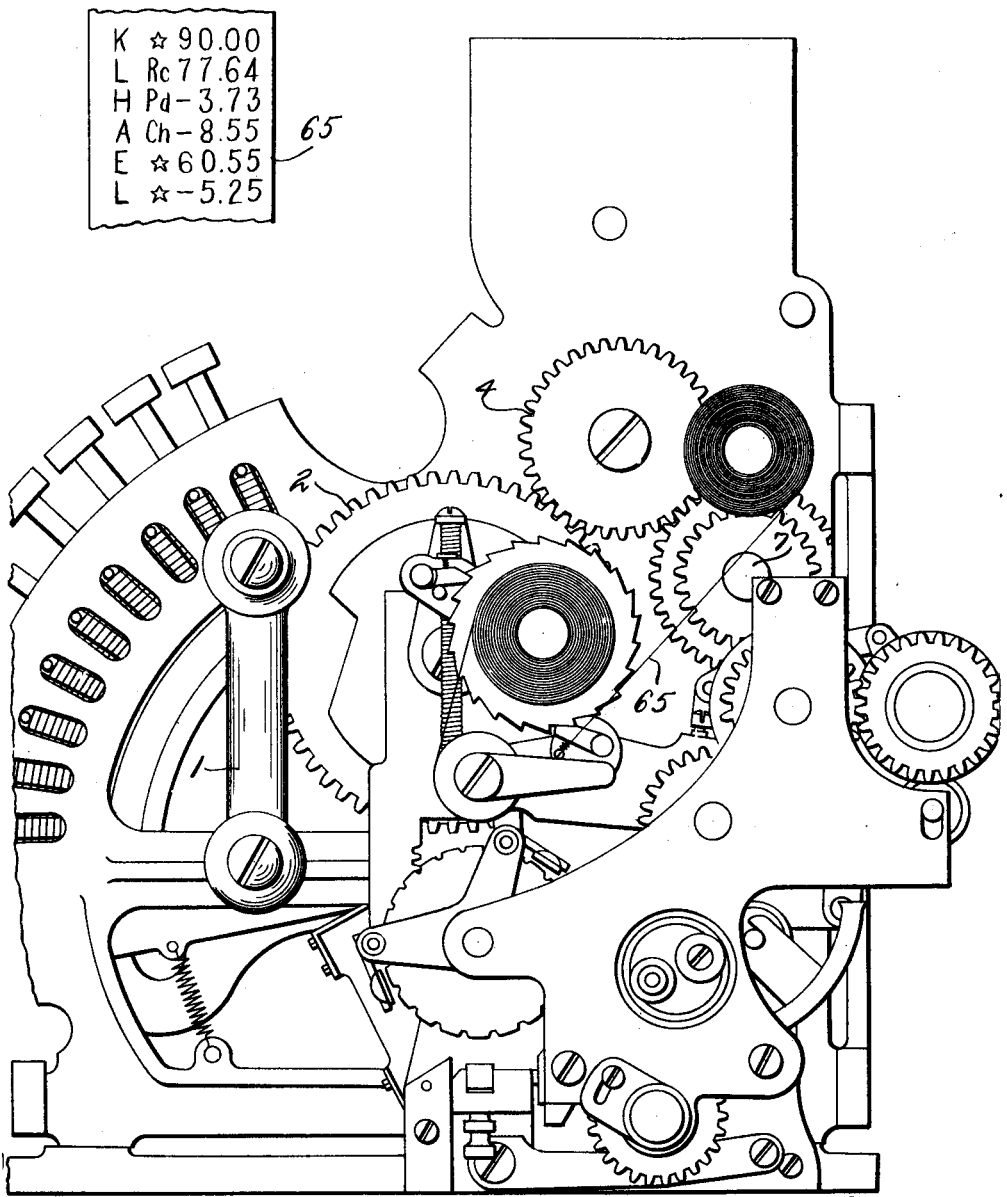

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

DRAWER CONTROL FOR CASH-REGISTERS.

1,183,021.

Specification of Letters Patent.

Patented May 16, 1916.

Application filed July 26, 1913. Serial No. 781,329.

*To all whom it may concern:*

Be it known that I, HAAKON A. MARTIN, a citizen of the United States, residing at Dayton, in the county of Montgomery and State of Ohio, have invented certain new and useful Improvements in Drawer Control for Cash-Registers, of which I declare the following to be a full, clear, and exact description.

This invention relates to multiple totalizer, multiple drawer cash registers or accounting machines constructed so that the drawers are selectively opened under the control of keys or other manipulative devices by operations of the machine, and has particular reference to machines of this type which are adapted to use in handling cash and credit transactions.

The main reason in the past for having a plurality of drawers attached to a cash register has been to provide a drawer for each clerk or department, thereby enabling the proprietor, by comparing the contents of the drawers with the records in the machine, to place individual responsibility for errors and shortages. As these registers are usually constructed, each drawer is represented on the keyboard of the machine by a key or a position to which a manipulative device may be adjusted and when the register is operated with the corresponding key depressed or with the manipulative device adjusted to the proper position, the desired drawer is released. Such registers usually have provision for making a record in the machine of all credit transactions, but the customers' individual account books are usually filed in a separate cabinet. Owing to the room that the separate filing cabinet takes up and other advantages to be gained, it is desirable to construct the multiple drawer cabinet attached to the register so that these individual account books can be filed in one or more of the drawers, the number of drawers depending upon the number of books to be filed, leaving the other drawers to be used in the usual way for the cash of the individual clerks or departments, and having the filing drawers so connected with the drawer releasing mechanism that access can only be had to them by operating the machine in such a way as to make the proper record of the transaction in the record retaining devices of the machine. Such a construction would make it desirable to so construct the drawer releasing mechanism that a clerk can by proper operation of the register, gain access to his cash drawer only on cash sales, or on credit sales where no money is handled, gain access to the proper filing drawer only. In addition to this where money is received on account it should be possible to release both the clerk's cash drawer and the filing drawer by a single operation of the machine, thereby insuring a proper entry of the transaction in the machine and permitting the clerk to make the entry in the customer's account book as well as deposit the money received in his own individual cash drawer.

So far as applicant is aware there has never been a drawer releasing mechanism devised that makes it possible to release the drawers in the manner outlined in the foregoing, and the main object of this invention is to accomplish the desired results.

The invention is shown as applied to a well known type of machine now on the market, a complete description of which may be found in the United States Letters Patent to J. P. Cleal and F. A. Reinhard, No. 580,378, dated April 13th, 1897, to Thomas Carroll No. 703,639, dated July 1st, 1893, and W. F. Bockhoff No. 616,866, dated December 27th, 1898. Reference may be made to these patents for a full description of the machine. The patent to Bockhoff referred to shows a machine having a plurality of cash drawers and a main releasing means for same controlled by a bank of keys. In the present invention this mechanism is used. The patent to Carroll shows and describes a multiple totalizer machine having a plurality of totalizers carried by a rotatable reel with a differentially adjustable lever for rotating the reel to bring any desired totalizer in operative relation to the actuating mechanism. In the present invention a second set of drawer releasing devices is so connected to this mechanism that adjustment of the lever to bring a certain totalizer into operative relation with the actuators will position the second set of drawer releasing devices so that the drawer corresponding to the totalizer used will be opened when the machine is operated.

In the accompanying drawings the register is shown as having two credit drawers, one for filing alphabetically customers' account books A to K and the other for the books L to Z. The register can, however, be constructed with whatever number of such drawers is necessary to take care of the account books. One merchant might need but one drawer, while another would need three or four because of having a larger number of credit customers. Only two of the clerks' cash drawers are shown, as that number serves to illustrate the working of the invention. It should be understood, however, that the register used for illustration has also nine cash drawers, one for each position shown in Figure 6 for the lever 8 and lettered in the same way, that is A, B, D, E, H, K, L, M, and N respectively. The credit drawers and the clerks' cash drawers are shown in a single tier with the former at the top and all in the same compartment of the multiple drawer cabinet. It is apparent, however, that this particular arrangement of the drawers is not essential to the successful operation of the improvement and that the drawers can just as well be arranged in two or more tiers or in separate compartments so long as any of the many possible variations of the operating connections to be described later can be used.

The machine in which the present embodiment of the invention is shown is used for illustrative purposes only and it is not the intention to limit its application to any one particular machine or any particular number or arrangement of drawers, or to limit its use to machines for handling cash and credit transactions. The two groups of drawers can be used for other classifications or the invention might simply be used to increase the number of drawers for clerks' cash that can be connected to the operating mechanism.

The inventive idea is one that can be embodied in various forms in a number of other types of registers and accounting mechanisms and be put to a number of other uses. In fact it can be used entirely independent of cash register construction in filing cabinets and similar devices having a plurality of receptacles and manipulative devices for opening the receptacles when it is desirable to be able to open the receptacles singly or in certain combinations by a single operation of the manipulative devices.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Figure 2:
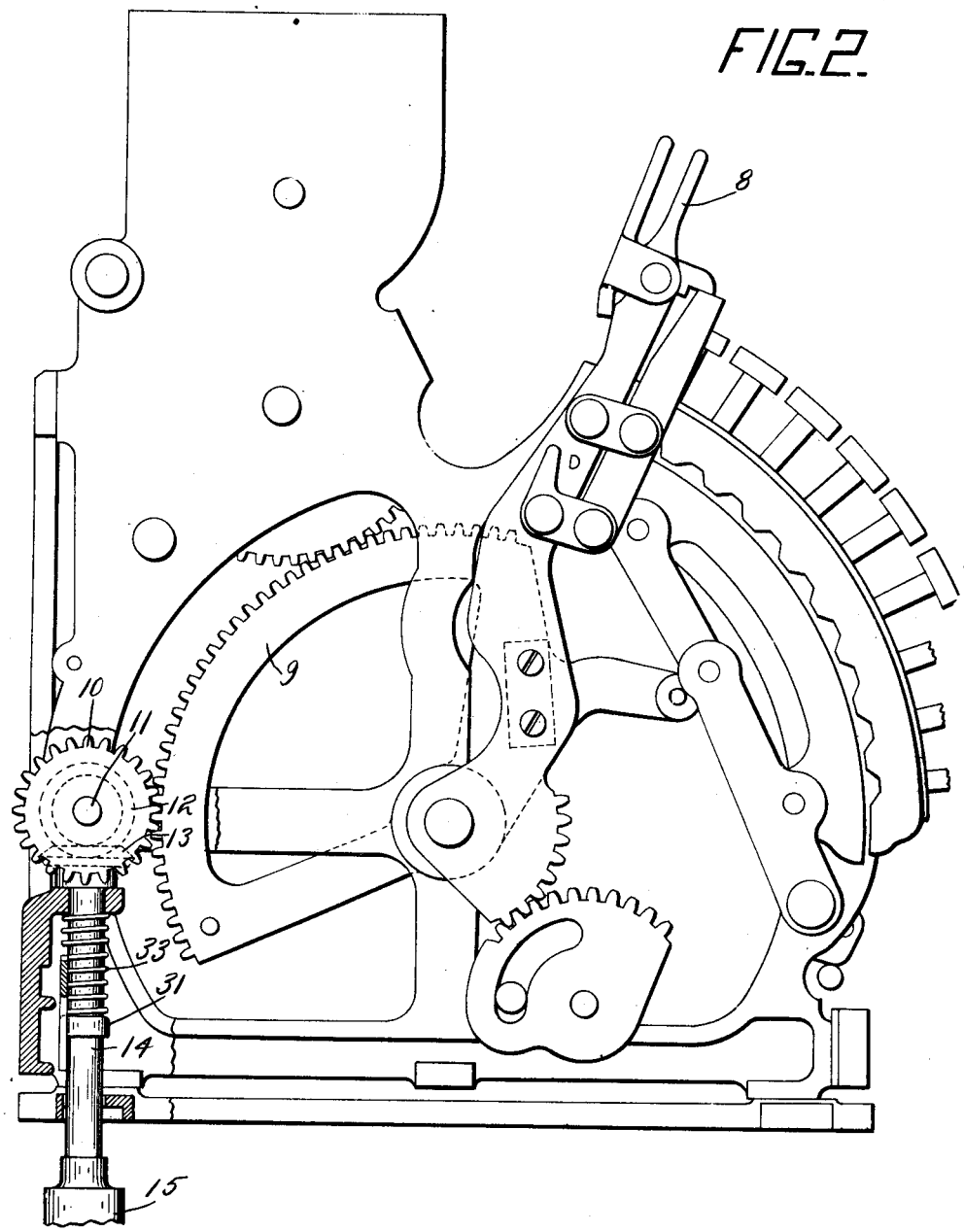

Of said drawings:—Fig. 1 is a right side elevation of a register partly broken away and shows one feature of the improvement. Fig. 2 shows mechanism for positioning the drawer releasing mechanism by means of a differentially adjustable lever. Fig. 3 shows drawer selecting mechanism controlled by a bank of keys. Fig. 4 is a rear view of the register partly broken away and shows parts of the drawer releasing mechanism. Fig. 5 is a rear view showing the drawer releasing mechanism assembled in operative relation to the cash drawers, the drawers being partly broken away. Fig. 6 is a detail showing the left hand row of keys and the lever controlling the clerks' totalizers and cash drawers. Fig. 7 is a detail showing part of an independent drawer release. Fig. 8 shows plan views of the drawer release rods and the parts assembled thereon. Fig. 9 is a group of details showing the shapes of the drawer controlling elements carried by the rod 29. Fig. 10 is a right side elevation of a register showing the printing mechanism. Fig. 11 is a detail strip showing how items are entered on the same by the printer.

The register shown in the drawings has vertical rows of amount keys, the number of rows depending upon the registering capacity desired, a row of transaction keys and a lever for rotating a reel (not shown) which carries a group of totalizers so as to bring any desired totalizer into operative relation with the registering mechanism. In addition to the reel totalizers, each of which adds only transactions registered with it in operative relation to the actuating mechanism, a main totalizer is provided which adds in one grand total all of the cash transactions registered in the machine; also a printing mechanism which lists on a strip of paper 65, (Figs. 10 and 11) all of the transactions in the order in which they are registered with designating characters to show the class of each transaction. The machine also has nine drawers only two of which are shown for handling cash and two drawers in which the customers' individual account books can be filed. Each drawer has the usual latch for holding it closed. Drawer releasing mechanism is provided which is so connected with the register operating mechanism proper that the drawers can only be opened by first operating the manipulative devices on the keyboard to determine which drawers are to be opened and then operating the machine. Power may be applied by a motor but as shown in the drawings the machine is operated manually by means of the usual crank.

The crank 1 (Fig. 1) has attached to its hub a pinion (not shown) meshing with a large intermediate gear 2 which turns idly on a stub shaft 3 fastened in the machine frame. This intermediate gear is in mesh at all times with a smaller gear 4 attached to a shaft 5 and a gear 4 in turn meshes with a gear 6 fastened to a shaft 7. These pinions and gears are so proportioned that when the crank is turned twice the shafts 5 and 7 are each given a complete rotation. The drawer releasing mechanism after it has been positioned to release the desired drawers is operated from the shaft 7 as will be explained in detail later on.

The invention uses two rotatable drawer release rods both having a limited extent of vertical movement instead of a single rod as shown in the Bockhoff patent. Each rod carries lugs or projections for controlling the tripping of the drawer latches and each has an independent mechanism by which it is rotated to bring the controlling elements into operative relation with the latch tripping mechanism of the drawers that are to be opened. The rotation of the rod 29 in the drawings is controlled by the left hand bank of keys shown in Fig. 3 and rod 14 is rotated by the differentially adjustable lever shown in Fig. 2 used to rotate the totalizer reel of the Carroll machine.

Referring to Fig. 2, the lever for positioning the reel totalizers and the drawer releasing mechanism is indicated by the numeral 8. Rigid with this lever is a segment 9 which is always in mesh with a spur gear 10 attached to a shaft 11. Fastened to this shaft is a bevel gear 12 (Fig. 4) which is always in mesh with a corresponding bevel gear 13. The gear 13 is splined on a drawer release rod 14, so that when the lever 8 is moved up or down the rod 14 is turned a corresponding distance but the rod is permitted to move longitudinally. In order to make it possible to remove the register from the multiple drawer cabinet both release rods are made in two sections and provided with clamps 15 holding the sections together. Fastened to the rod 14 is a finger or extension 16 (Figs. 5 and 8) for each of the clerks' cash drawers 17. These fingers are arranged spirally around the shaft so that some one of them is at all times in engagement with its corresponding drawer catch trip lever 18 and moving the lever 8 to any desired position on the lever way as shown in Fig. 6, turns the rod 14 so as to bring the corresponding finger 16 in operative relation to the drawer catch trip lever 18 of the desired drawer. The axial displacement of the fingers on the rod 14 is shown by the dotted outlines below a disk 40 in the left view of Fig. 8. Each drawer is held closed by a latch 19 (Figs. 1, 3 and 5) which has a hook engaging a plate 20 fastened to a frame 21 back of the drawers. After the drawer to be released has been selected as just described, raising the rod will cause the pivoted trip lever 18 to press the catch 19 down out of engagement with the plate 20 and release the drawer so that it can be thrown open by an ejector spring or any other desired means. The manner in which the rod is raised will be described later.

Referring to Fig. 3, a segment 22 is positioned differentially under the control of keys 23 on operations of the machine. This differential movement is fully explained in the Cleal and Reinhard patent above mentioned. An extension 24 on this segment is always in mesh with a spur gear 25 rotating on the shaft 11. Rigid with the gear 25 and turning on the same shaft is a bevel gear 27 which is always in mesh with a bevel gear 28 splined on the drawer release rod 29. The differential movement of the segment 22 will through these parts rotate the rod 29 and position the devices attached to it in the same manner as just outlined in connection with the operation of the lever 8, after which the rod is raised to perform its functions. The mechanism for raising the shafts 14 and 29 will next be described. The shaft 29 has (Fig. 4) a collar 30 rigidly fastened to it and the shaft 14 has a similar collar 31 which is not attached to the rod but is free to move up and down. Between this collar 31 and a lug on a machine frame 32 is a spring 33. A lever 34 pivoted at 35 extends across the rear of the machine under the collars 30 and 31. A pitman 36 has a hook at the lower end engaging a notch in the left end of the lever 34 and at the other end of the pitman is a hook 37 (Fig. 3) engaging the shaft 7. Fastened to the shaft 7 is a cam 38. An anti-friction roller 39 fastened in the upper end of the pitman 36 rides on the edge of this cam and when the shaft 7 is rotated the cam acting against the roller 39 will raise the pitman 36 and lift the end to which it is attached to the lever 34. As the collar 30 is fastened to the rod 29, that rod will be raised; but the collar 31 will simply slide up along the rod 14 and compress the spring 33 without lifting the rod 14. When the roll 39 passes over the point of the cam 38 this spring 33 will return the lever 34 to normal and allow the parts lifted by the lever to drop back to their original positions.

As indicated above, the rod 14 is not directly connected to the operating mechanism, but it is raised through the rod 29. The mechanism whereby this is accomplished is shown in Fig. 5. It consists of the disk 40 attached to the rod 14, a disk 41 attached to the rod 29 and a lever 42 which has one end pivoted at 43 to a bracket 44 attached to the machine frame and has its free end extending above the disk 41 and under the disk 40. A stud 45 holds the lever up in the position shown. On the under side of the lever 42 is an extension, indicated by the dotted outline 46, adapted to be engaged on certain kinds of operations by the disk 41. When the rod 29 is raised in the manner described above if the disk 41 strikes the extension 46 the lever 42 will be swung on its pivot bringing the free end of the lever into engagement with the disk 40 and raising the rod 14. Every time the rod 14 raises the clerk's cash drawer represented by whichever position the lever 8 is occupying at the time will be released as the corresponding finger 16 will be resting in operative relation to its latch trip lever 18. However on a charge operation no clerk's cash drawer should be opened, consequently the rod 14 should not be raised. To provide for this the disk 41 is cut away at 412 (Fig. 9) so that when either one of the charge keys is used and the rod 29 rotated by the differential mechanism the cut away portion of the disk is brought under the extension 46 of the lever 42 and the subsequent raising of the shaft 29 and disk 41 will have no effect upon the lever 42. As a result the rod 14 is not lifted and no clerk's cash drawer will be opened. When the rod 29 is at this position, that is, with the cut away portion of the disk resting under the extension 46 of the lever 42, either a finger 26ᵃ or a finger 26ᵇ, depending upon which of the charge keys was pressed, will be under its particular one of the levers 47. These levers 47 are similar to the lever 42, but have their free ends resting under the latch trip levers 18 for the two charge drawers 48 so that when the shaft 29 is raised whichever finger is in operative position at the time will rock its lever 47, thereby operating the latch trip for the charge drawer corresponding to the key pressed.

It will readily be seen that this construction makes it possible to open a charge drawer 48 only or a clerk's cash drawer 17 only depending upon which of the keys, cash or charge, shown in Fig. 6 is pressed. However, this does not fully accomplish all the desired results as when money is received on account it is desirable to gain access to the drawer containing the customer's individual account book and also open the proper clerk's cash drawer so that the money received can be deposited therein. In the herein disclosed construction when a received on account transaction is registered the proper clerk's cash drawer is released in the usual way and, in addition to this, both the charge drawers are released. This is accomplished by shaping the fingers 26ᵃ and 26ᵇ so that the fingers and the disk 41 will all simultaneously operate their respective levers when the received on account key is used. It is for this reason that the finger 26ᵃ is made double in width and the finger 26ᵇ made with two extensions. The shape of both of these fingers is best shown in Fig. 9. The portions of the fingers designated 100 and 101 are the ones that are brought into play when the keys charge A-K and charge L-Z respectively are depressed. Portions designated by the numerals 102, and 103 and the portion of the disk by the numeral 104 are all in the same vertical plane and when the received on account key is depressed the differential mechanism places all three in position to perform their functions and when the rod 29 is raised the portion 102 and 103 of the fingers 26ᵃ and 26ᵇ will operate their levers 47 to release both of the charge drawers and the portion 104 of the disk 41 will operate the lever 102 to raise the rod 14 and release the cash drawer of the clerk who handled the transaction. This enables the clerk to deposit the cash received in his own drawer and gives him access to the customer's account book so that the proper credit can be entered in it.

In order to fully explain the operation of the improvement a summary will be given of what the parts do during the entry by clerk B of a transaction of each of the five classes indicated by the keys shown in Fig. 6 beginning with a paid out transaction. The clerk will first set the lever 8 at B on the lever index. This rotates the rod 14 so as to bring the proper finger 16 in operative relation to the latch trip lever 18 of the B cash drawer. The operative position of the finger is indicated by the numeral 16ᵃ (Fig. 8). The paid out key is next depressed and the crank 1 turned. The differential mechanism rotates the shaft 29 unless it has been left in the paid out position by reason of the preceding operation having been one for entering a paid out transaction, and when fully set the disk 41 and the fingers attached to the shaft 29 will be in the position shown in Figs. 8 and 9. The portion 105 of the disk 41 will be under the extension 46 on the lever 42. Then when the rod 29 is raised the lever 42 will be operated, the rod 14 raised and the B drawer released. Neither of the fingers attached to the rod 29 is at this time in operative position so the levers 47 are not affected when the rod 29 is raised and consequently no charge drawer is released. When the received on account key is pressed and the register operated the rod 29 is turned by the differential mechanism so that the portion 102 of the finger 26ᵃ and the portion 103 of the finger 26ᵇ, are in engagement with their respective levers 47 while the portion 104 of the disk 41 is brought into engagement with the lever 42. Consequently when the rod 29 is raised both of the levers 47 and the lever 42 are operated releasing both of the charge drawers 48 and raising the rod 14 so as to release the B clerk's cash drawer. When the charge A-K key is pressed and the register operated the rod 29 will be rotated to the next position so that the upper half of the cutaway portion 412 (Fig. 9) of the disk 41 will be brought under the extension 46 of the lever 42. At the same time the portion 100 of the finger 26a will be brought into engagement with its lever 47 while the cutaway portion of the finger 26b will be brought under the extension on its lever 47. Thus it will be seen that only the portion 100 of the finger 26a is in effective position and when the rod is raised only the corresponding lever 47 will be operated, releasing the charge A-K drawer. When the charge L-Z key is used the rod 29 is rotated one division from the position where it was left by the charge A-K registration. This carries the finger 26a out of operative relation to its lever 47 and brings the extension 101 of the finger 26b into operative relation with its lever 47. At the same time the disk 41 is turned so that the lower half (Fig. 9) of the cut away portion 412 of the disk 41 is under the extension 46 of the lever 42. When the rod 29 is now raised only the lever 47 for the finger 26b will be operated consequently only the charge L-Z drawer will be released. When the cash key is used the rod 29 is rotated so as to bring the portion 106 of the disk 41 under the extension 46 of the lever 42. This rotation of the rod of course carries both of the fingers 26a and 26b out of operative relation to the levers 47. Consequently when the rod 29 is raised only the lever 42 will be operated, thereby raising the rod 14 and releasing the clerk's cash drawer.

Under certain conditions it might be desirable to be able to gain access to the charge filing drawers without having to operate the register proper. Where this is the case the devices shown in the accompanying drawing may be applied. A lever 52 (Figs. 1 and 7) is provided for each of the filing drawers. These levers are pivoted on a stud 53 fastened in the frame of the machine. Pivoted to the rear end of each of the levers is a long link 54 extending down back of the drawers. The lower end of each link engages a lever 55 pivoted at 56 to the frame 21 with the right end (Fig. 5) extending above the drawer latch 19. Pressing down on the forward end of one of the levers 52 will raise the link 54 and rock the lever 55 about its pivot 56 and push its corresponding drawer latch 19 out of engagement with the drawer latch plate 20 thereby allowing the drawer to be ejected by the spring usually provided for that purpose.

While the form of mechanism herein shown and described is admirably adapted to fulfil the objects primarily stated, it is to be understood that it is not intended to confine the invention to the one form of embodiment shown and described herein, as it is susceptible of embodiment in various forms, all coming within the scope of the claims which follow.

What is claimed is:—

1. In a machine of the class described, the combination with an accounting device, the means whereby transactions may be entered therein according to a predetermined classification, manipulative means for predetermining the classification under which an item is to be entered, a group of normally inaccessible receptacles, means controlled by said manipulative means for rendering one or more of said receptacles accessible by entering transactions of certain classes, a second group of normally inaccessible receptacles, other manipulative means, and means controlled by the last mentioned manipulative means for rendering the receptacles of the second group accessible, said first mentioned rendering means being so constructed that the second mentioned rendering means will be ineffective to render one of its receptacles accessible, regardless of the operation of the second mentioned manipulative means, upon the entering of a transaction of a certain class.

2. In a machine of the class described, the combination with an accounting device, of means whereby transactions may be registered in the accounting device according to a predetermined classification, a plurality of normally inaccessible receptacles, and means whereby but one receptacle may be rendered accessible by entering a transaction of a certain class or only one other receptacle rendered accessible by entering a transaction of a second class or two rendered accessible simultaneously by entering a transaction of a third class.

3. In a machine of the class described, the combination with an accounting device in which items may be entered according to a predetermined classification, of an operating mechanism for the accounting device, manipulative devices for predetermining the classification under which an item is to be entered by an operation of said operating mechanism, a plurality of groups of normally inaccessible receptacles, and means controlled by said manipulative devices whereby the entry of an item of a certain class will render any desired receptacle of one group accessible, or the entry of a transaction of another class will render all of the receptacles in the other group accessible on a single operation of the register mechanism.

4. In a machine of the class described, the combination with an accounting device in which items may be entered according to a predetermined classification, of an operating mechanism for the accounting mechanism, manipulative devices for predetermining the classification under which an item is to be entered by operations of said operating mechanism, a plurality of groups of normally inaccessible receptacles, and means controlled by said manipulative devices whereby the entry of an item of a certain class will render any desired receptacle of one group accessible, or the entry of a transaction of another class will render any desired receptacle in the other group accessible, or the entry of a transaction of a third class will render any desired receptacle in one group and a plurality of the receptacles in the other group accessible on a single operation of the operating mechanism.

5. In a machine of the class described, the combination with an accounting device in which items may be entered according to a predetermined classification, of an operating mechanism for the accounting device, manipulative means for predetermining the classification under which items are to be entered in the accounting device by operations of said operating mechanism, a plurality of groups of normally inaccessible receptacles, and means controlled by said manipulative means whereby only one desired receptacle in either group can be rendered accessible by an operation of the accounting device operating mechanism, or receptacles in both groups rendered accessible by a single operation of said operating mechanism.

6. In a machine of the class described, the combination with a main operating mechanism, of a plurality of receptacles, two classes of manipulative means, and means controlled by said manipulative means of both classes and means controlled by the manipulative means of one class whereby the receptacles may be opened singly or in desired combinations by the operation of the operating mechanism.

7. In a machine of the class described, the combination with an operating mechanism, of a plurality of groups of normally latched receptacles, manipulative devices, and means controlled by said manipulative devices whereby a single receptacle in any one of the groups or a plurality comprising receptacles in each of the groups may be unlatched by an operation of the operating mechanism.

8. In a machine of the class described, the combination with an accounting device, of means whereby transactions may be entered in the accounting device according to predetermined classification, manipulative means for predetermining the classification, under which an item is to be entered, a normally inaccessible credit receptacle, means controlled by said manipulative means for rendering said receptacle accessible, a plurality of normally inaccessible cash receptacles, clerk's manipulative means, and means controlled by said clerk's manipulative means for rendering any one of said cash receptacles accessible, said first mentioned rendering means being so constructed that the last mentioned rendering means upon the entering of a transaction of a certain class will be ineffective to render a cash receptacle accessible regardless of the manipulation of the clerk's manipulative means.

9. In a machine of the class described, the combination with an operating mechanism, of a plurality of groups of normally locked drawers, means for unlocking drawers in either or both groups by operations of the operating mechanism, and means controlled by the unlocking means for one group whereby the unlocking means for the other group may be disabled.

10. In a machine of the class described, the combination with a plurality of drawers, of a plurality of releasing devices for said drawers, and manipulative means for determining the drawer or drawers to be opened and controlling connections whereby one of said releasing devices can be operated by the other releasing device.

11. In a machine of the class described, the combination with a plurality of drawers, of separate drawer releasing devices, manipulative devices for determining the drawers to be released, and connections whereby the device for releasing certain drawers is operated by the releasing device for the other drawer.

12. In a machine of the class described, the combination with a plurality of drawers, of a plurality of drawer releasing devices each controlling the releasing of certain drawers, and connections whereby the operation of one of said drawer releasing devices controls the opening by the other drawer releasing device of its drawers.

13. In a machine of the class described, the combination with an operating mechanism, of a plurality of groups of drawers with latches for holding the drawers closed, an independent device for each group for unlatching the drawers on operations of the operating mechanism, manipulative devices for each group under the control of which the unlatching devices are brought into operative relation to the drawers selected, and means controlled by the manipulative device of one group for determining whether or not the other unlatching device is to unlatch the drawer selected.

14. In a machine of the class described, the combination with an accounting device, of an operating mechanism therefor for entering transactions according to predetermined classifications, a plurality of groups of normally latched receptacles, a rotatable drawer release rod for each group having fingers to unlatch said receptacles, means for rotating the rods to bring the fingers into operative relation with the drawer latches, means for raising one of the rods each time the operating mechanism is operated, and connections from the last mentioned rod to the other rod whereby the second rod may be raised or not according to the class of the transaction entered in the registering device by an operation of the aforesaid operating mechanism.

15. In a machine of the class described, the combination with a recording device for listing items according to certain classifications, of an operating mechanism therefor, a plurality of receptacles having a latch for each receptacle to hold the receptacle closed, a rotatable drawer release rod for each group having lugs for tripping said latches, means for differentially rotating the rods to bring the lugs into operative relation to the latches, means for moving one of the rods longitudinally each time the operating mechanism is operated, and connections from the last mentioned rod to the second rod whereby the second rod may be moved longitudinally or not according to the class of the transaction listed in the recording device by an operation of the aforesaid operating mechanism.

16. In a machine of the class described, the combination with an accounting device, of means whereby transactions may be entered in the accounting device according to a predetermined classification, clerk's manipulative means, charge and received on account keys, cash receptacles appropriate to each clerk represented by the clerk's manipulative means, a credit drawer, and means controlled by the clerk's manipulative means and the charge and received on account keys whereby the desired clerk's receptacle is rendered accessible on the entering of a cash transaction under the control of the clerk's manipulative means, a clerk's receptacle and the credit drawer being rendered accessible by the entering of a received on account transaction under the control of the clerk's manipulative means and a received on account key, and only the credit drawer rendered accessible under the control of the charge key by the entering of a charge transaction regardless of the manipulation of the clerk's manipulative means.

17. In a machine of the class described, the combination with an accounting device, of means whereby transactions may be entered in the accounting device according to a predetermined classification, clerk's manipulative means, charge keys, a received on account key, normally inaccessible cash receptacles appropriate to the clerks represented by the clerk's manipulative means, a plurality of normally inaccessible credit receptacles, and means controlled by said clerk's manipulative means and said keys whereby the desired clerk's receptacle is rendered accessible under the control of the clerk's manipulative means on the entering of a cash transaction, only the credit receptacles being rendered accessible under the control of the charge keys, regardless of the manipulation of the clerk's manipulative means, by the entering of a charge transaction, and a desired clerk's receptacle and a desired credit receptacle rendered accessible under the control of the received on account key and the clerk's manipulative means on the entering of a received on account transaction.

In testimony whereof I affix my signature in the presence of two witnesses.

HAAKON A. MARTIN.

Witnesses:
R. C. GLASS,
CARL BEUST.